(12) United States Patent
Nawathe

(10) Patent No.: US 11,354,290 B2
(45) Date of Patent: Jun. 7, 2022

(54) QUERY PROCESSING USING INVERTED INDEX OF PREDICATE STATEMENTS

(71) Applicant: ADOBE INC., San Jose, CA (US)

(72) Inventor: Sandeep Nawathe, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 80 days.

(21) Appl. No.: 16/777,399

(22) Filed: Jan. 30, 2020

(65) Prior Publication Data

US 2021/0240685 A1 Aug. 5, 2021

(51) Int. Cl.
*G06F 16/22* (2019.01)
*G06F 16/2455* (2019.01)
*G06F 16/242* (2019.01)

(52) U.S. Cl.
CPC ...... *G06F 16/2246* (2019.01); *G06F 16/2428* (2019.01); *G06F 16/2455* (2019.01)

(58) Field of Classification Search
CPC ............. G06F 16/2246; G06F 16/2428; G06F 16/2455
USPC ........................................................ 707/742
See application file for complete search history.

(56) References Cited

U.S. PATENT DOCUMENTS

| | | | |
|---|---|---|---|
| 7,917,501 B2* | 3/2011 | Arends | G06F 16/24564 707/718 |
| 8,296,748 B2* | 10/2012 | Cheng | G06F 8/433 717/156 |
| 8,738,608 B2* | 5/2014 | Pauly | G06F 16/13 707/716 |
| 9,110,946 B2* | 8/2015 | Chen | G06F 16/2453 |
| 9,378,239 B1* | 6/2016 | Long | G06F 16/9024 |
| 9,378,241 B1* | 6/2016 | Shankar | G06F 16/2425 |
| 9,535,963 B1* | 1/2017 | Shankar | G06F 16/2433 |
| 2005/0091183 A1* | 4/2005 | Cunningham | G06F 16/2246 |

(Continued)

OTHER PUBLICATIONS

Mohan, C., et al., "Single table access using multiple indexes: Optimization, execution, and concurrency control techniques", Proceedings of the 2nd international conference on extending database technology: Advances in Database Technology, pp. 29-43, (Mar. 1990).

(Continued)

*Primary Examiner* — Hanh B Thai
(74) *Attorney, Agent, or Firm* — Shook, Hardy & Bacon LLP

(57) ABSTRACT

A query processing system generates and employs an inverted index of predicates for predicate statement evaluation. The inverted index maps values for variables to predicates that evaluate to true for the corresponding values. When querying input data, the query processing system identifies a value for each variable in the input data. For each value and variable pair, the query processing system identifies predicates mapped to the value for the variable in the inverted index. The query processing system evaluates the predicate statements by treating each predicate identified from the inverted index as true. In some configurations, the query processing system represents each predicate statement using a bit string and evaluates the predicate statements for the input data by setting bits to one for predicates identified from the inverted index and determining predicate statements that evaluate to true based on the bit strings.

20 Claims, 12 Drawing Sheets

(56) References Cited

U.S. PATENT DOCUMENTS

| | | | |
|---|---|---|---|
| 2008/0288442 A1* | 11/2008 | Feigenbaum | G06F 16/313 |
| 2008/0306910 A1* | 12/2008 | Singh | G06F 16/832 |
| 2009/0063397 A1 | 3/2009 | Beavin et al. | |
| 2010/0023931 A1* | 1/2010 | Cheng | G06F 8/433 |
| | | | 717/156 |
| 2011/0016109 A1 | 1/2011 | Vassilvitskii et al. | |
| 2011/0078134 A1 | 3/2011 | Bendel et al. | |
| 2011/0213660 A1 | 9/2011 | Fontoura et al. | |
| 2011/0252073 A1* | 10/2011 | Pauly | G06F 16/13 |
| | | | 707/812 |
| 2012/0054225 A1* | 3/2012 | Marwah | G06F 16/2457 |
| | | | 707/769 |
| 2012/0089594 A1 | 4/2012 | Krishna et al. | |
| 2012/0173517 A1 | 7/2012 | Lang et al. | |
| 2013/0262498 A1* | 10/2013 | Chen | G06F 16/2453 |
| | | | 707/765 |
| 2014/0156587 A1* | 6/2014 | Momtchev | G06F 16/283 |
| | | | 707/600 |
| 2014/0317115 A1* | 10/2014 | Pauly | G06F 16/213 |
| | | | 707/737 |
| 2014/0358894 A1 | 12/2014 | Wei et al. | |
| 2014/0379690 A1 | 12/2014 | Ahmed et al. | |
| 2015/0032763 A1* | 1/2015 | Marwah | G06F 16/2457 |
| | | | 707/754 |
| 2015/0234888 A1* | 8/2015 | Ahmed | G06F 16/24535 |
| | | | 707/765 |
| 2017/0075898 A1* | 3/2017 | Deshpande | G06F 16/9535 |
| 2017/0075984 A1* | 3/2017 | Deshpande | G06F 16/319 |
| 2017/0083571 A1* | 3/2017 | Shankar | G06F 16/24575 |
| 2018/0285475 A1* | 10/2018 | Grover | G06F 16/86 |
| 2019/0253254 A1* | 8/2019 | Brownlee | H04L 9/0618 |
| 2019/0332698 A1* | 10/2019 | Cho | G06F 16/2365 |
| 2020/0004736 A1* | 1/2020 | Liu | G06F 16/2379 |
| 2020/0134032 A1* | 4/2020 | Lin | G06F 16/284 |
| 2020/0341981 A1 | 10/2020 | Fender et al. | |

OTHER PUBLICATIONS

First action interview Office Action dated Nov. 29, 2021 in U.S. Appl. No. 16/777,412, 4 pages.

Preinterview first Office Action dated Oct. 6, 2021 in U.S. Appl. No. 16/777,412, 4 pages.

Preinterview first Office Action dated Nov. 19, 2021 in U.S. Appl. No. 16/777,405, 6 pages.

First Action Interview Office Action dated Feb. 14, 2022 in U.S. Appl. No. 16/777,405, 6 pages.

Final Office Action dated Apr. 28, 2022 in U.S. Appl. No. 16/777,412, 38 pages.

* cited by examiner

| URL_TERM INDEX | |
|---|---|
| TRAVEL | 12:9,... |
| CRUISE | 12:10, |
| FINANCE | ... |

602

| DEVICETYPE INDEX | |
|---|---|
| TABLET | 12:3,... |
| DESKTOP | ... |
| MOBILE | ... |

604

| ADID INDEX | |
|---|---|
| 1 | ... |
| 2 | ... |
| 3 | 12:4,... |

606

| METRO INDEX | |
|---|---|
| 94087 | ...,12:6,... |
| 94086 | ...,12:7,... |
| ... | ... |

```
R^A                        // Set of all RHS values from P^A
genericIndex = {}          // map of value -> Set{ ^Ap_i, ^Ap_j,... } foreach ^Ap_i in P^A do    // for each predicate in dimension A
    foreach v in ^Ap_i.values() do // for each RHS value of the predicate
        if (^Ap_i.operator = '=') then
            genericIndex[v].add(^Ap_i)
        elseif (^Ap_i.operator = '!=') then
            foreach x in R^A do
                if (x != v) then
                    genericIndex[x].add(^Ap_i)
                endif
            done
        elseif (^Ap_i.operator = '>') then
            foreach x in R^A do
                if (x > v) then
                    genericIndex[x].add(^Ap_i)
                endif
            done
        elseif (^Ap_i.operator = '≥') then
            foreach x in R^A do
                if (x > v) then
                    genericIndex[x].add(^Ap_i)
                endif
            done
            genericIndex[v].add(^Ap_i)
        elseif (^Ap_i.operator = '<') then
            foreach x in R^A do
                if (x < v) then
                    genericIndex[x].add(^Ap_i)
                endif
            done
        elseif (^Ap_i.operator = '≤') then
            foreach x in R^A do
                if (x < v) then
                    genericIndex[x].add(^Ap_i)
                endif
            done
            genericIndex[v].add(^Ap_i)
        endif
    done
done
```

*FIG. 11.*

QUERY PROCESSING USING INVERTED INDEX OF PREDICATE STATEMENTS

CROSS-REFERENCE TO RELATED APPLICATIONS

This patent application is related by subject matter to: U.S. patent application Ser. No. 16/777,405, titled QUERY PROCESSING USING MATRIX AND REDUCED PREDICATE STATEMENTS, filed on even date herewith; and U.S. patent application Ser. No. 16/777,412, titled QUERY PROCESSING USING HYBRID INVERTED INDEX OF PREDICATES, filed on even date herewith. Each of the aforementioned applications is incorporated herein by reference in its entirety.

BACKGROUND

As the amount of available digital information continues to grow exponentially, search techniques have become paramount for quickly and efficiently querying information. Traditionally, search indexes have been used to index and retrieve information. Search indexes are often comprised of posting lists (sometimes called an inverted index). A posting list may store, for instance, data identifying a list of the documents containing a particular term. When a search query is received, the search index is queried to identify documents containing terms identified from the search query. This approach of using posting lists has been successful in particular areas, such as Internet webpages, where data is relatively stable (i.e., smaller changes to webpages over longer periods of time). However, areas where the information is less stable pose challenges to the use of such posting listings as the indexed information changes significantly over shorter periods of time, making it difficult to update and maintain the posting lists.

SUMMARY

Embodiments of the present invention relate to, among other things, a query processing system that employs inverted indexes of predicates for predicate statement evaluation. The query processing system takes a collection of predicate statements to be evaluated and generates one or more inverted indexes from the predicate statements. The inverted index maps values for variables to predicates (from the collection of predicate statements) that evaluate to true for the corresponding values. When querying input data, the query processing system identifies a value for each of a number of variables in the input data. For each value and variable pair, the query processing system identifies any predicates mapped to the value for the variable in the inverted index. The query processing system evaluates the predicate statements by treating each predicate identified from the inverted index as true. In some configurations, each predicate statement is also represented as a bit string, in which each predicate and logical operator from the predicate statement corresponds with a bit position in the bit string. The query processing system can employ the bit strings during the evaluation process by setting bits for predicates identified from the inverted index to one and determining predicate statements that evaluate to true based on the bit strings.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 6 is a diagram providing an example of inverted indexes generated for variables included in the predicate statement used to generate the tree of FIG. 3 and the bit string 400 of FIG. 4;

FIG. 11 provides pseudocode for an indexing method in accordance with some implementations of the present disclosure.

DETAILED DESCRIPTION

Definitions

Figure 1:
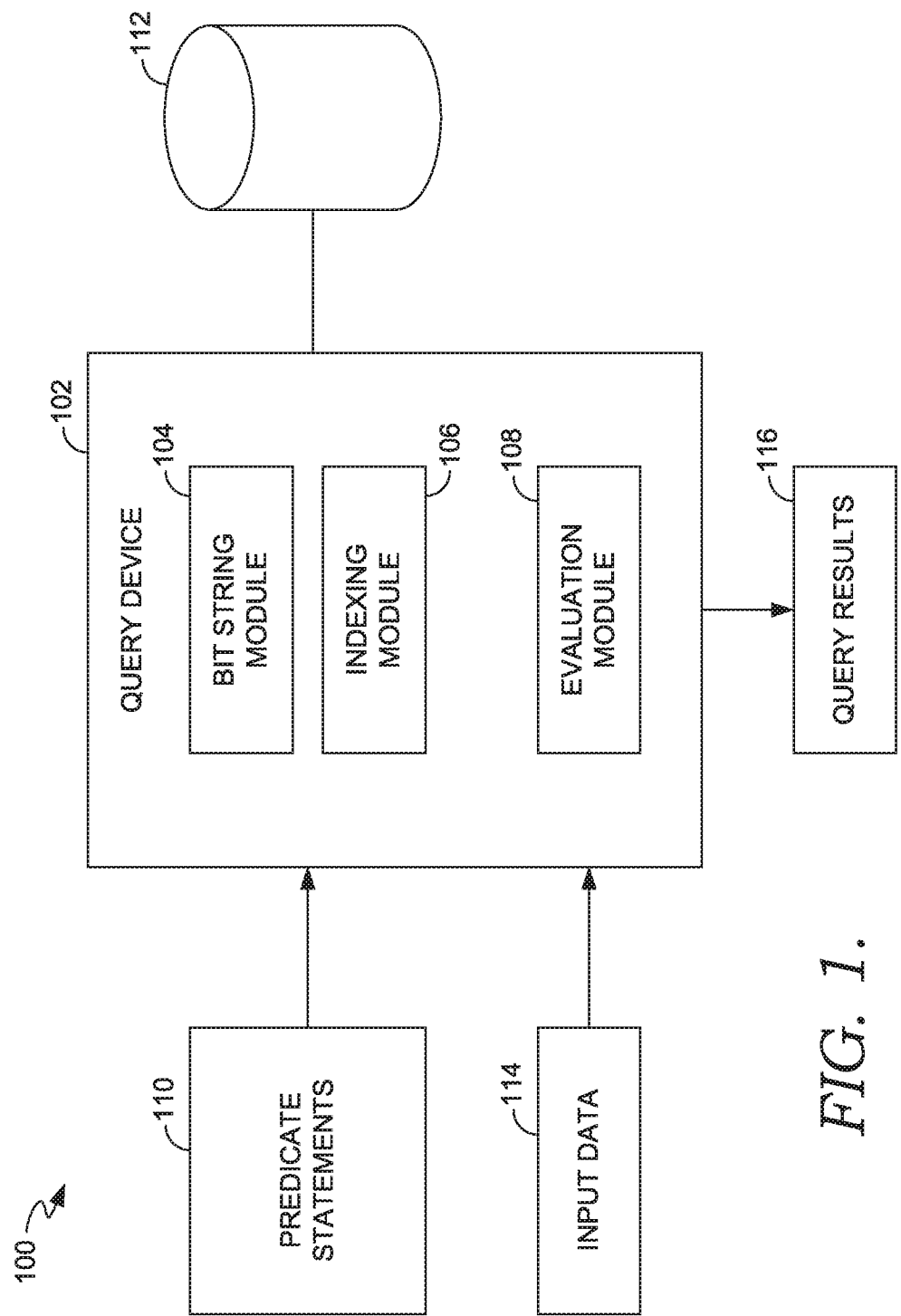
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "predicate" refers to a condition to be evaluated as either "true" when the condition is satisfied or "false" when the condition is not satisfied. A predicate can generally be represented as: LHS OPERATOR RHS, where LHS refers to a left-hand side that is a "variable," RHS refers to a right-hand side that is a "predicate value" that can be a constant or a predicate value for the variable, and OPERATOR refers to a "predicate operator" for comparing the LHS and RHS. Predicator operators includes: <, <=, =, !=, >, and >=. Shown below are a few examples of predicates to illustrate:

1) r<=10, where "r" is a variable, <= is an operator, and 10 is a predicate value that is a constant.
2) state='CA', where "state" is a variable, = is an operator, and 'CA' is a predicate value that is a constant.
3) x>y, where "x" is a variable, > is an operator, and "y" is a predicate value that is a variable.

A "predicate statement" joins individual predicates using logical operators, which may be Boolean operators, such as AND, OR, and NOT. Provided below is an example of a predicate statement combining the above predicates using logical operators (parenthesis are included to assist in readability):

((r<=10) OR (x>y)) AND (state='CA')

As used herein, a "predicate statement identifier" refers to an identifier assigned to a predicate statement to uniquely identify the predicate statement in a collection of predicate statements. For instance, the predicate statement identifier assigned to each predicate statement from a collection of predicate statements can be a sequential number.

A "predicate statement tree" or "tree" is a tree expression of a predicate statement in which each leaf node corresponds with a predicate from the predicate statement and each intermediate node corresponds with a logical operator from the predicate statement.

A "node identifier" refers to an identifier assigned to each predicate and each logical operator in a predicate statement.

A "predicate identifier" refers to an identifier that uniquely identifies a predicate in a collection of predicate statements. In some configurations, a predicate identifier used to uniquely identify a predicate can be a combination of a predicate statement identifier for the predicate statement containing the predicate and the node identifier assigned to the predicate.

As used herein, a "bit string" refers to a collection of bits each having a bit position in the bit string in which the bit value for each bit position can be zero or one. For example, a bit string of [0101] has four bit positions, in which each of the first and third bit positions has a bit value of zero and each of the second and fourth bit positions has a bit value of one.

Overview

Query processing for many domains is often accomplished by conventional query processing systems expressing queries using a set of predicate statements and evaluating the predicate statements against data being queried. Each predicate statement includes one or more predicates, and each predicate represents a condition to be evaluated. The goal of such query processing systems is to provide evaluations that are accurate, complete, and performed in a short period of time (e.g., a few milliseconds). Although each predicate statement can be sequentially evaluated for a truth value, when a large number of predicate statements are involved, the evaluation process can be both resource and time intensive for the query processing system. Some approaches, such as the RETE algorithm, have been developed to facilitate the evaluation process but still include drawbacks in resource requirements (including processing and memory requirements) and the time required for the query processing systems to process the queries.

Embodiments of the present invention are directed to a query processing system that addresses these challenges by providing a solution that efficiently evaluates predicate statements for query processing. At a high level, the query processing system builds inverted indexes of predicates to be evaluated. While conventional search systems typically employ inverted indexes storing data to be queried, the query processing system described herein forms inverted indexes of predicates (i.e., query representations).

In accordance with the technology described herein, a collection of predicate statements to be evaluated are processed to generate one or more inverted indexes for predicates from the predicate statements. For instance, an inverted index can be generated for each variable found in the predicate statements. For each variable, the inverted index maps predicate values for the variable to predicates, from the collection of predicate statements, that evaluate to true for the predicate values to which each predicate is mapped.

The query processing system employs the inverted index to evaluate predicate statements to query input data that includes values for different variables. For given input data, the query processing system identifies values for variables set forth in the input data. For each variable/value pair from the input data, the query processing system performs a lookup on the inverted index to identify predicates mapped to the value for the variable. The predicate statements are evaluated as true or false by treating each predicate identified from the inverted index as true within the predicate statements.

In some configurations, in addition to processing the collection of predicate statements to generate the inverted index, each predicate statement is processed to represent the predicate statement as a bit string. The bit string for a predicate statement is generated as an array of bit positions such that each predicate and each logical operator from the predicate statement corresponds with a bit position in the bit string. The query processing system can employ the bit strings during the evaluation process by setting bit values to one for predicates identified from the inverted index and determining predicate statements that evaluate to true based on the bit strings.

The query processing system described herein provides a number of advantages over conventional systems. Initially, the use of inverted indexes of predicates increases efficiency in several ways. For instance, inverted indexes of predicate statements allow the query processing system to avoid sequential evaluation of predicates and avoid evaluation of predicates when input data does not affect the truth state of predicates. In some configurations, the query processing system generates inverted indexes that consider the predicate value(s) and operator for each predicate, thereby allowing a single lookup in an inverted index to identify all matching predicates for given input data with a particular value for a variable. In configurations in which predicate statements are represented as bit strings, each predicate statement can be stored using very few bits, which is highly memory efficient, and allows for easy cloning and state management during evaluation to further improve efficiency. Additionally, the query processing system can run the predicate statement evaluation as bit wise AND, OR, and NOT operations on bit strings, which helps modern processors and compilers to optimize for performance.

Query System Using Inverted Indexes of Predicate Statements

With reference now to the drawings, FIG. 1 is a block diagram illustrating an exemplary system 100 for querying data using inverted indexes built from predicates in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes query device 102, which includes a bit string module 104, an indexing module 106, and an evaluation module 108. The query device 102 shown in FIG. 1 can comprise a computer device, such as the computing device 1200 of FIG. 12, discussed below. While the query device 102 is shown as a single device in FIG. 1, it should be understood that the query device 102 may comprise multiple devices cooperating in a distributed environment. For instance, the query device 102 could be provided by multiple server devices collectively providing the functionality of the query device 102 as described herein. Additionally, other components not shown may also be included within the network environment. When multiple devices are employed, the devices can communicate via a network (not shown), which may include, without limitation, one or more local area networks (LANs) and/or wide area networks (WANs). Such networking environments are commonplace in offices, enterprise-wide computer networks, intranets, and the Internet. It should be understood that any number of devices and networks may be employed within the system 100 within the scope of the present invention.

At a high level, the query device 102 generally operates to build an inverted index from predicate statements and employ the inverted index when querying input data. The query device 102 can also generate bit strings from predicate statements and employed the bit strings in conjunction with the invented index when evaluating the predicate statements for the input data. As shown in FIG. 1, the query device 102 includes a bit string module 104, indexing module 106, and evaluation module 108.

The bit string module 104 operates to generate a bit string for each predicate statement from a collection of predicate statements 110. One approach for the bit string module 104 to generate a bit string for a predicate statement is described in detail below with reference to FIG. 2. A bit string comprises an array of bit positions with each bit position corresponding to a predicate or a logical operator from the predicate statement. In other words, each predicate and logical operator from the predicate statement corresponds to a bit position in the bit string. Representing a predicate statement as a bit string allows the predicate statement to be expressed in a very few bits, which is highly memory efficient and allows for easy cloning and statement management during rule evaluation, thus improving efficiency. Additionally, representing a predicate statement as a bit string allows for evaluation of the predicate statement to run as bit wise AND, OR, and NOT operations, which helps modern processors and compilers to optimize for performance.

In some configurations, the bit string module 104 assigns a predicate statement identifier to each predicate statement from the collection of predicate statements 110, and uses the same predicate statement identifier to identify the corresponding bit string. Additionally, for each predicate statement, the bit string module 104 assigns a node identifier to each predicate and each logical operator. In some configurations, this may include representing the predicate statement as tree with each leaf node corresponding to a predicate and each intermediate node corresponding to a logical operator. The edges between nodes in the tree are structured based on the relationships among predicates and logical operators in the predicate statement. A combination of a predicate statement identifier and node identifier can be used to uniquely identify predicates and logical operators among the collection of predicate statements 110. For instance, a predicate identifier uniquely identifying a predicate can be based on a combination of a predicate statement identifier for the predicate statement in which the predicate is located and a node identifier for the predicate.

The bit string module 104 generates a bit string for a given predicate statement by including a bit position for each predicate and logical operator from the predicate statement. In some configurations, the bit position corresponds with the node identifier assigned each predicate and logical operator. The bit value for each bit position in the bit string for the predicate statement is initialized to zero or one. In some configurations, the bit value for each bit position corresponding to a predicate statement is initialized to zero, and bit values for each logical operator are initialized to zero or one based on the logical operator and bit value(s) of child node(s). The bit strings are stored in data store 112, such that the bit strings can retrieved when evaluating predicate statements to query input data.

The indexing module 106 operates to build one or more inverted indexes of predicates from the collection of predicate statements. Some approaches for the indexing module 106 to generate one or more inverted indexes of predicates is described in detail below with reference to FIGS. 5 and 10. The inverted index built by the indexing module maps predicates that evaluate to true for particular values for variables. As such, the inverted index provides a mechanism for efficient evaluation of predicate statements by: avoiding sequential evaluation of predicates, avoiding evaluation of predicates when input data does not affect the truth state of the predicates, and allowing a single lookup to find all matching predicates.

In some configurations, the indexing module 106 builds the inverted index by identifying predicates from the collection of predicate statements that contain a given variable. The predicate values corresponding to that variable are also identified from those predicates containing the given variable. An entry in the inverted index is created for each predicate value, and each predicate containing the variable is indexed against one or more predicate values based on the predicate value for each predicate and its predicate operator. This process is performed for each variable contained in predicates in the collection of predicate statements. In some configurations, a separate inverted index is generated for each variable. The inverted index(es) is(are) stored in the date store 112, for use in evaluating predicate statements for input data. The inverted index can use r-b tree as its data structure. However, it should be understood by one skilled in the art that other types of data structures may be employed.

The evaluation module 108 operates to employ the inverted index built by the indexing module 106 and/or the bit strings generated by the bit string module 104 to evaluate predicate statements for input data 114 in order to provide query results 116. Some approaches for the evaluation module 108 to evaluate predicate statements for input data are described in detail below with reference to FIGS. 7 and 8.

In operation, the evaluation module 108 accesses the input data 114, which includes values for one or more variables. The evaluation module 108 performs a lookup in the inverted index stored in the data store 112 to identify predicates that evaluate to true for each variable/value pair. For a given variable/value pair, the evaluation module 108 may look up the value for the variable in the inverted index and identify the predicate(s) indexed against the value. The evaluation module 108 evaluates predicate statements by treating each predicate identified from the inverted index as true in the predicate statements.

In some configurations, the evaluation module 108 employs bit strings for predicate statements to evaluate the predicate statements. For each predicate identified from the inverted index based on the input data, the evaluation module 108 identifies the predicate statement for the predicate and accesses the bit string for the predicate statement. This may be based on a predicate statement identifier associated with the predicate stored in the inverted index. Additionally, for each predicate identified based on the input data, the evaluation module 108 determines the bit position in the bit string corresponding to the predicate. This may be based on a node identifier associated with the predicate stored in the inverted index. The evaluation module 108 iteratively evaluates bit values for parent nodes based on the logical operator associated with each intermediate node and bit value(s) of child node(s). If the bit value for the root node for the bit string is set to zero, the predicate statement is evaluated to false. Alternatively, if the bit value for the root node is set to one, the predicate statement is evaluated to true. A result set is generated that includes predicate statements evaluated to true, and query results 116 are provided based on the evaluation process.

Generating Bit Strings for Predicate Statements

Figure 2:
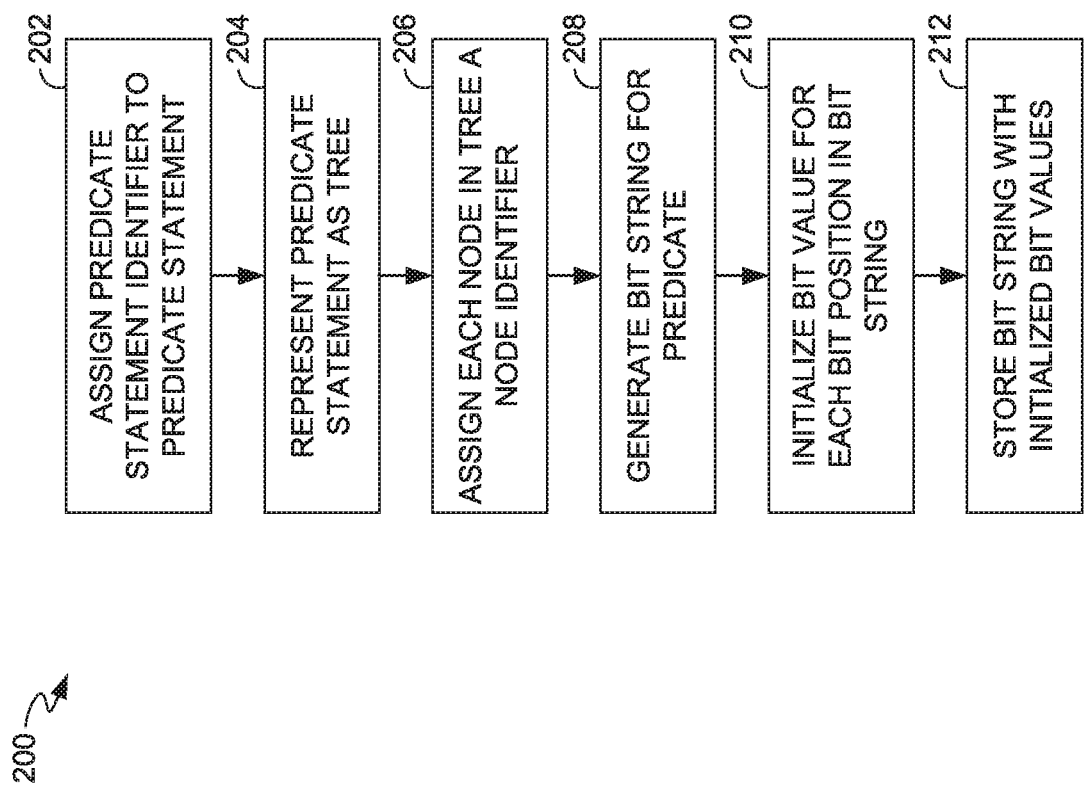
FIG. 2 is a flow diagram showing a method for generating a bit string for a predicate statement in accordance with some implementations of the present disclosure.

With reference now to FIG. 2, a flow diagram is provided that illustrates a method 200 for generating a bit string for a predicate statement. The method 200 may be performed, for instance, by the bit string module 104 of FIG. 1. The method 200 may be performed for each predicate statement in a collection of predicate statements to be evaluated. Each block of the method 200 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 202, the predicate statement is assigned a predicate statement identifier. This allows each predicate statement to be uniquely identified using its predicate statement identifier. In some configurations, each predicate statement is assigned a sequential number as its predicate statement identifier. However, it should be understood that other approaches for assigning predicate statement identifiers to predicates statements may be employed within the scope of the technology described herein.

The predicate statement is represented as a tree, as shown at block 204. To represent the predicate statement as a tree, each predicate from the predicate statement is represented as a leaf node, and each logical operator from the predicate is represented as an intermediate node. In some configurations, predicate operators that are negations of the type !=' are converted to NOT and '='. This eliminates negations from leaf nodes. Relationships between the nodes in the tree are based on the relationship of the operators and predicates within the predicate statement.

Each node in the predicate statement is assigned a node identifier, as shown at block 206. In some configurations, the nodes of the tree are numbered using a depth first walk of the tree. This may include sequentially assigning consecutive numbers to each node. However, it should be understood that any other number scheme may be used within the scope of the technology described herein.

The node identifier for a predicate serves to uniquely identify each predicate within that predicate statement. Each predicate can be uniquely identified within a collection of predicate statements as a combination of the predicate statement identifier for the predicate statement of the predicate and the predicate identifier for the predicate. Thus, a combination of a predicate statement identifier and node identifier serve as a predicate identifier to uniquely identify a predicate within a collection of predicate statements.

Figure 3:
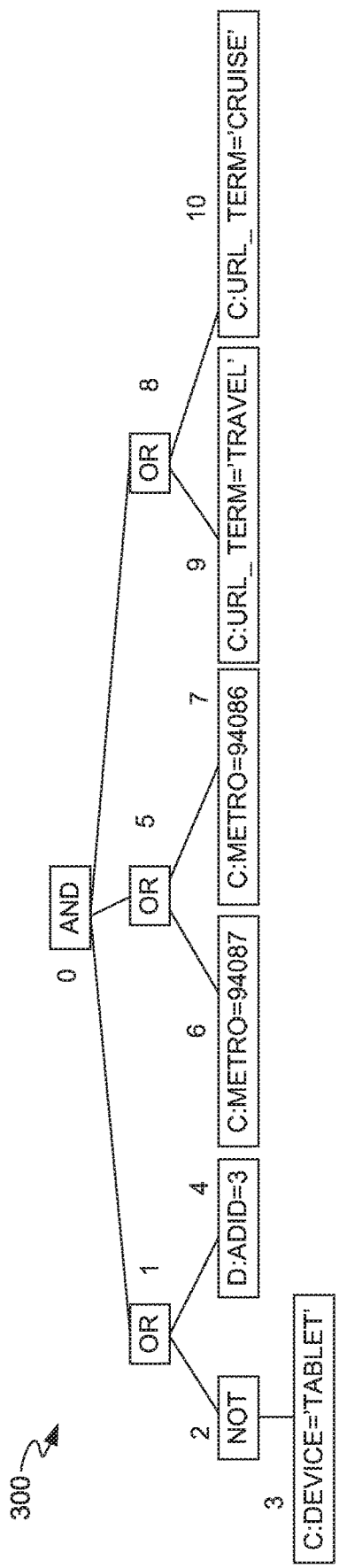
FIG. 3 is a diagram providing an example of a tree generated from a predicate statement.

FIG. 3 provides an example of a tree 300 generated from the predicate statement: "(C:device!='tablet' OR D:adid=3) AND (C:metro=94087 OR C:metro=94086) and (C:url='travel' OR C:url='cruise'). As can be seen in FIG. 3, each predicate from this example predicate statement is represented as a leaf node in the tree 300 and each logical operator is represented as an intermediate node in the tree 300, with the relationships among the nodes based on the relationships among the predicate statements and logical operators in the predicate statement. Because the predicate "C:device!='tablet'" includes a negation operator '!=", the predicate has been represented in the tree using the NOT logical operator and the '=" predicate operator. As also shown in FIG. 3, each node has been assigned a node identifier using a depth first walk of the tree using consecutive numbers and starting with zero.

Returning to FIG. 2, a bit string is generated for the predicate statement as shown at block 208. The bit string includes a bit position for each node in the tree that was generated at block 206. As such, each predicate and each logical operator from the predicate statement corresponds with one of the bit positions in the bit string. In some configurations where sequential numbering is used for node identifiers, each logical operator and predicate from the predicate statement are assigned a bit position within the bit string based on its node identifier (e.g., node 0 is assigned bit position 0, node 1 is assigned bit position 1, etc.). It should be understood that although the method 200 has been described as generating a bit string using a tree representation of the predicate statement, a bit string can be generated for a predicate statement without the use of a tree representation in other configurations of the technology described herein.

The bit value for each bit position in the bit string is initialized to zero or one, as shown at block 210, and the bit string with initialized bit values is stored at block 212. Initializing the bit values includes initializing the bit value for each predicate to zero. The initialized bit values for each logical operator is determined using logical operators and bit value(s) of child node(s). This may be performed iteratively starting from leaf nodes until the root node is reached such that the bit value for each node is initialized.

Figure 4:
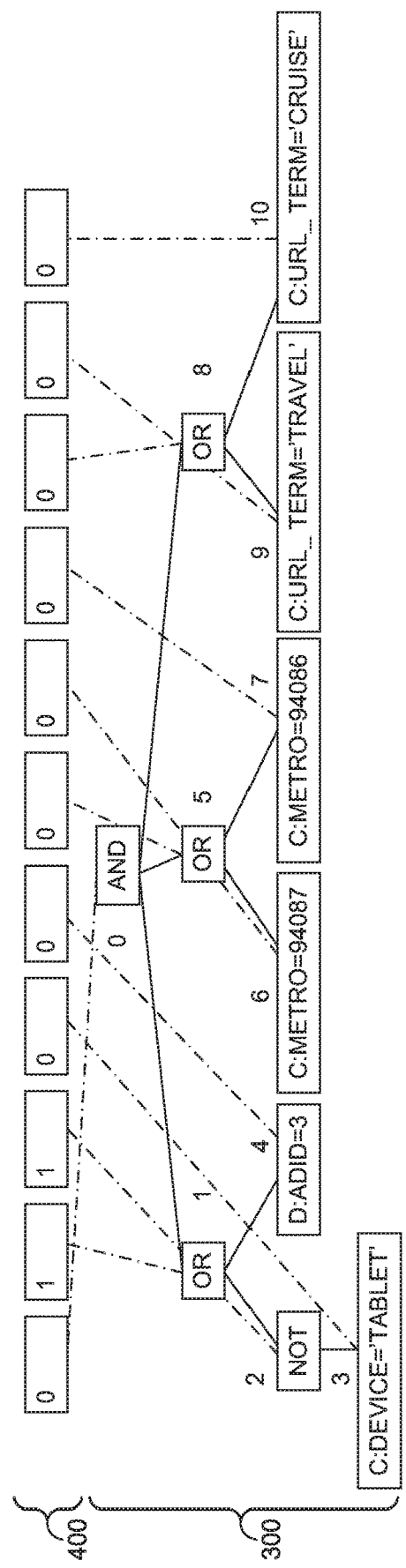
FIG. 4 is a diagram providing an example of a bit string generated and initialized for the predicate statement used to generate the tree shown in FIG. 3.

FIG. 4 provides an example of a bit string 400 generated and initialized for the example predicate statement used to generate the tree 300 shown in FIG. 3. As shown by the dashed lines in FIG. 4, each bit position in the bit string 400 corresponds with a node from the tree 300. Because there are eleven nodes in the tree 300, there are eleven bit positions in the bit string 400. Each node is assigned a bit position based on its node identifier (i.e., node 0 is assigned bit position 0, node 1 is assigned bit position 1, etc.). As can be seen from FIG. 4 each bit position corresponding to a predicate has a bit value initialized to zero, and the bit position corresponding to each logical operator has been initialized to either zero or one based on the logical operator and bit value(s) of child node(s). For instance, the bit value corresponding to node 5 has been initialized to zero because node 5 corresponds to the OR logical operator and each of its child nodes (nodes 6 and 7) have bit values initialized to zero. As another example, the bit value corresponding to node 2 has been initialized to one because node 2 corresponds to the NOT logical operator and its child node (node 3) has been initialized to zero, and the bit value corresponding to node 1 has been initialized to one because node 1 corresponds to the OR logical operator and the bit value for one of its child nodes (i.e., node 2) has been initialized to one.

Building Inverted Index for Predicate Statements

Figure 5:
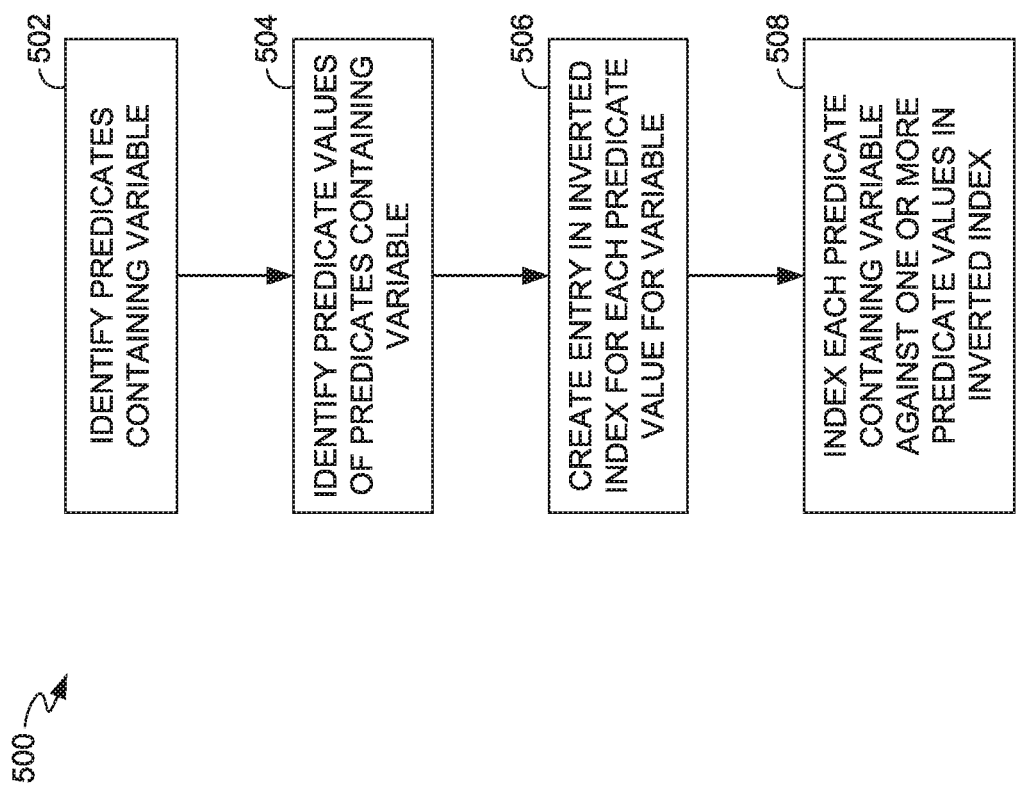
FIG. 5 is a flow diagram showing a method for generating an inverted index from a collection of predicate statements in accordance with some implementations of the present disclosure.

Turning next to FIG. 5, a flow diagram is provided that illustrates a method 500 for generating an inverted index from a collection of predicate statements. The method 500 may be performed, for instance, by the indexing module 106 of FIG. 1. The method 500 may be performed for each variable from predicates in a collection of predicate statements to be evaluated. For a given variable, predicates containing that variable are identified, as shown at block 502. Each predicate value of predicates having the given variable are identified, as shown at block 504. An entry in the inverted index is created for each identified predicate value for the given variable, as shown at block 506. In cases of predicates where the predicate value is not a constant, a transformation is applied to generate a new variable that is compared against a constant for indexing purposes. For instance, for the predicate (x<y), a transformation is applied to create the form ((x−y)<0), and a new variable z=(x−y) is introduced. Other transformations can also be used in accordance with the scope of technology described herein.

Each predicate with the given variable is indexed against one or more predicate values, as shown at block 508. For a given predicate, the predicate value in the predicate and the predicate operator in the predicate are used to determine where to index the predicate. Depending on the predicate operator, the predicate can be indexed against one or predicate values. For instance, a predicate with the '=' predicate operator would be indexed against a single predicate value, while a predicate with the '<' predicate operator could be indexed against multiple predicate values. As such, a single lookup of a predicate value in the inverted index returns a list of all predicates that evaluate to true for the predicate value. As a result, the inverted index does not require evaluation of predicates.

FIG. 6 provides an example of inverted indexes generated for the four variables included in the example predicate statement used above when generating the tree 300 of FIG. 3 and the bit string 400 of FIG. 4. In particular, the inverted index 602 corresponds to the "URL_Term" variable, the inverted index 604 corresponds to the "DeviceType" variable, the inverted index 606 corresponds to the "AdId" variable, and the inverted index 608 corresponds to the "Metro" variable. Each predicate from the example predicate statement has been indexed in one of the inverted indexes 602, 604, 606, 608 based the variable and predicate value of the predicate. Additionally, each predicate is identified using a predicate identifier that comprises a combination of a predicate statement identifier and a node identifier. In FIG. 6, the example predicate statement has been assigned the predicate statement identifier of "12" and each predicate has been assigned a node identifier based on the sequential numbering of nodes from the expression tree 300. For instance, the predicate "C:url_term='travel'" has a predicate identifier of "12:9" based on the predicate statement identifier '12' and node identifier '9'. As shown in FIG. 6, this predicate has been indexed in the inverted index 802 for the "URL_Term" variable against the "travel" predicate value. While FIG. 6 only shows predicates indexed for the example predicate statement, predicates from any number of predicate statements can be indexed.

Querying Data Using Inverted Index and Bit String

Figure 7:
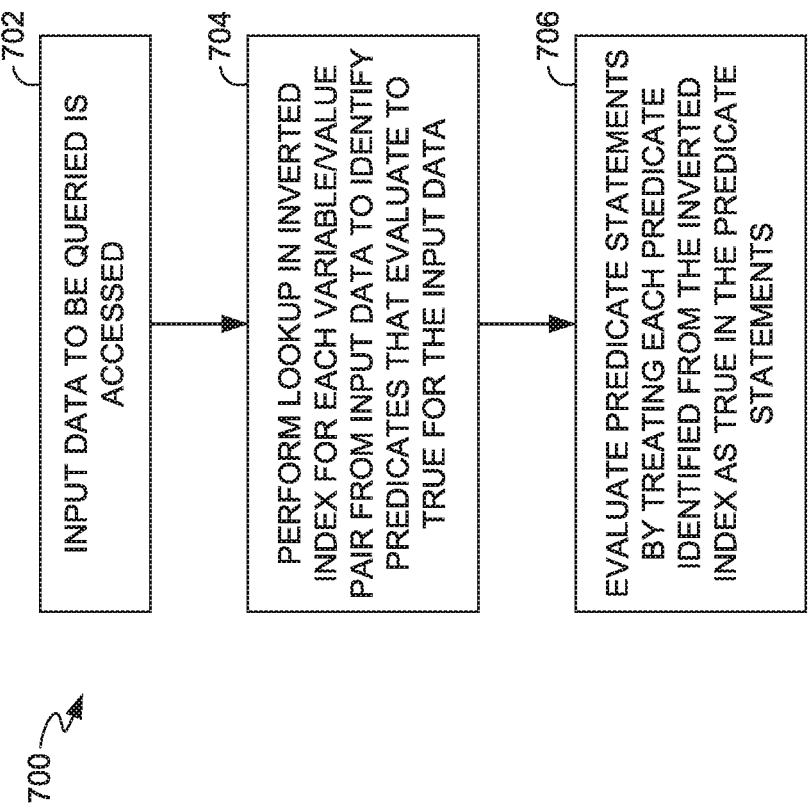
FIG. 7 is a flow diagram showing a method for querying input data by evaluating predicate statements using an inverted index generated from a collection of predicate statements in accordance with some implementations of the present disclosure.

Referring next to FIG. 7, a flow diagram is provided that illustrates a method 700 for querying input data by evaluating predicate statements using an inverted index generated from a collection of predicate statements. The method 700 may be performed, for instance, by the evaluation module 108 of FIG. 1. As shown at block 702, input data to be queried is accessed. The input data includes values for any number of variables.

For each variable and its value from the input data, a lookup is performed in an inverted index to identify any predicates mapped to each variable and value, as shown at block 704. This provides a set of identified predicates that are treated as true for the input data. One or more predicate statements that include the identified predicates are evaluated by treating each identified predicate as true in the predicate statement(s), as shown at block 706.

Figure 8:
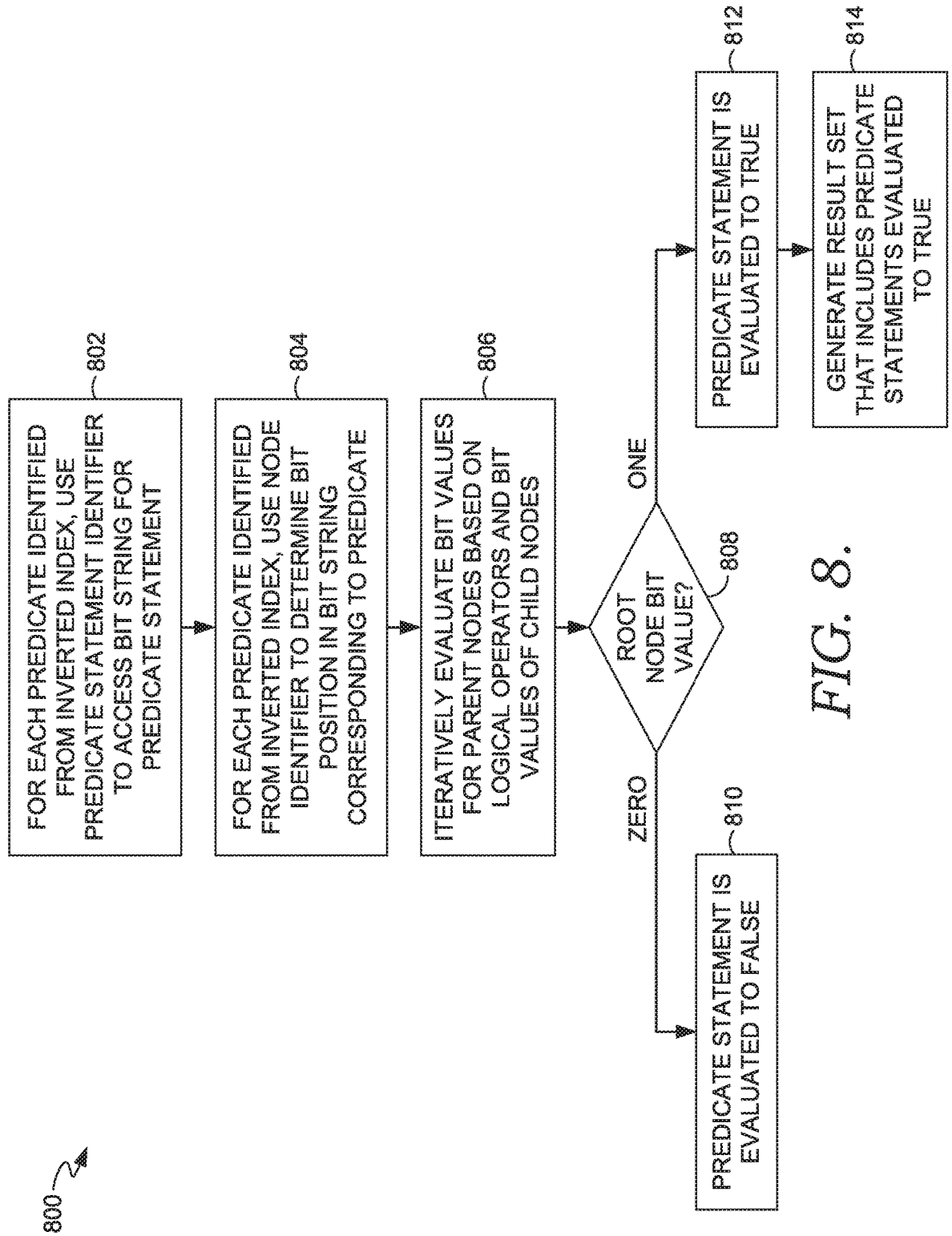
FIG. 8 is a flow diagram showing a method for using a bit string to evaluate a predicate statement in accordance with some implementations of the present disclosure.

In some configurations, the process of evaluating a predicate statement at block 706 is performed using a bit string for the predicate statement (e.g., a bit string generated in accordance with the method 200 of FIG. 2). However, it should be understood that the evaluation of predicate statements can be performed without the use of bit strings in other configurations. FIG. 8 provides a flow diagram of a method 800 for using a bit string to evaluate a predicate statement. The method 800 may be performed, for instance, by the evaluation module 108 of FIG. 1. As shown at block 802, for each predicate from the set of identified predicates from the inverted index (e.g., at block 704 of FIG. 7), the predicate statement identifier is used to identify the predicate statement that includes the predicate, and the default bit string for that predicate statement is accessed. Additionally, the node identifier for the predicate is used to determine the bit position in the bit string corresponding to that predicate, and the bit value is set to one in that bit position, as shown at block 804. The bit values of parent nodes are iteratively evaluated based on the logical operators associated with the nodes and the bit values of child nodes until the bit position for the root node is reached, as shown at block 806.

A determination is made as to whether the bit value for the root node is set to zero or one, as shown at block 808. If the bit value for the root node is set to zero, the predicate statement is evaluated to false, as shown at block 810. Alternatively, if the bit value for the root node is set to one, the predicate statement is evaluated to true, as shown at block 812. Based on this process for multiple predicate statements, a result set is generated that includes predicate statements evaluated to true, as shown at block 814. In some cases, a default result set may be initialized based on initialized bit strings for all predicate statements. For instance, some initialized bit strings may evaluate to true and are included in the initialized default result set. The process of generating the result set includes removing bit strings that evaluate to false and adding bit strings that evaluate to true based on the process described in FIG. 8.

Figure 9:
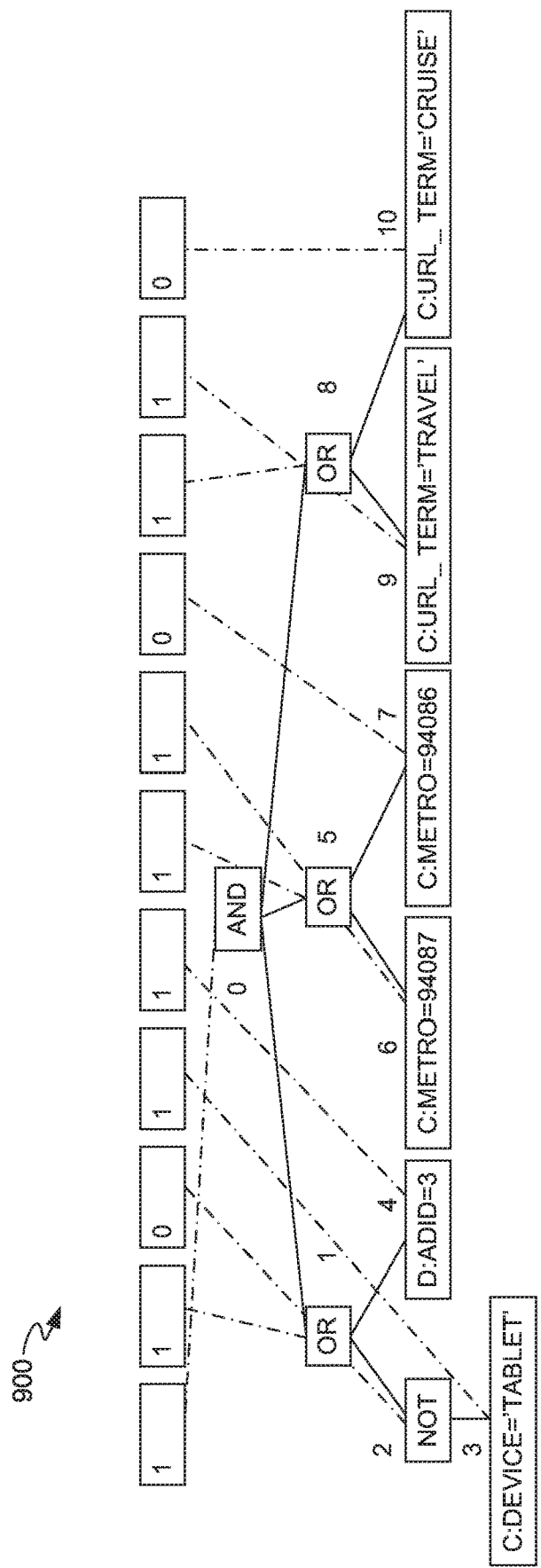
FIG. 9 is a diagram providing an example of evaluation of the predicate statement used to generate the bit string of FIG. 4.

FIG. 9 provides an example of the evaluation of the example predicate statement used to generate the bit string 400 of FIG. 4. Suppose, for instance, input data includes the predicate value "tablet" for the variable "DeviceType", the predicate value "3" for the variable "AdId", the predicate value "94087" for the variable "Metro", and the predicate value "travel" for the variable "URL_Term". Based on this input data, the bit values for the $3^{rd}$, $4^{th}$, $6^{th}$, and $9^{th}$ bit positions has been set to one in the bit string 900. Additionally, the bit values for the intermediate nodes (i.e., in the $0^{th}$, $1^{st}$, $2^{nd}$, $5^{th}$, and $8^{th}$ bit positions) are iteratively determined upward based on the logical operators and bit values of child nodes. As a result of the evaluation, the bit value for the root node (i.e., corresponding to the $0^{th}$ bit position) is set to one, thereby indicating the predicate statement evaluates to true for the input data.

Operator Aware Inverted Index and Evaluation

Figure 10:
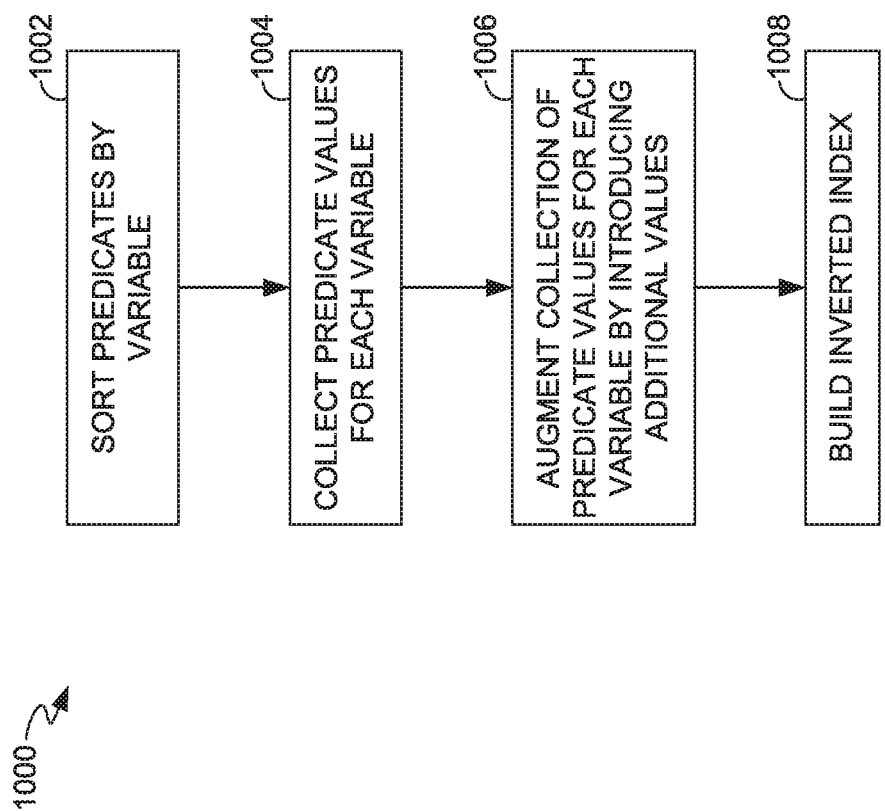
FIG. 10 is a flow diagram showing another method for generating an inverted index from a collection of predicate statements in accordance with some implementations of the present disclosure.

In accordance with some configurations, the inverted indexes are generated to handle three types of predicate values: non-metric discreet values (e.g., string, character, Boolean, etc.); metric discreet values (e.g., integer); and metric continuous values (e.g., real number). Additionally, some configurations generate inverted indexes to handle different types of comparison operators, including $<$, $\leq$, $=$, $!=$, $>$, and $\geq$. FIG. 10 provides a flow diagram that illustrates another method for generating an inverted index from a collection of predicate statements that addresses the different types of predicate values and comparison operators. The method 1000 may be performed, for instance, by the indexing module 106 of FIG. 1.

As shown at block 1002, predicates are sorted by their respective variables. In the present description, the term "dimension" is used interchangeably with variable. Accordingly, the dimension for variable A is denoted as $d^A$. D is used to denote the set of all dimensions such that, $D=\{d^A, d^B, d^C \ldots\}$. For each variable (i.e., dimension $d^K$), all the predicate values (i.e., RHS values) are collected in a set, as shown at block 1004. This set is referred as the range of values for that dimension $d^K$, denoted as $R^K$.

To handle input data with values for variables outside of the range of predicate values indexed for each variable, augmentation is employed to introduce additional values to the range of predicate values for variables, as shown at block 1006. These additional values can be denoted by special symbols. For instance, to handle values for non-metric variables that do not belong to the range of predicate values for a variable, a special value, denoted by symbol θ, is added to the Range $R^K$. At the evaluation time, the missing variable assignment value(s) from input data are augmented with a single symbol θ. Thus, the assignment $\{A=\{\theta\}\}$ matches the predicate $(A \neq v_1)$.

In addition, to handle the variable assignment of a value for a metric attribute that doesn't belong to the range of predicate values, two special values are added, denoted as $\theta_{LOW}$ and $\theta_{HIGH}$, to the Range $R^K$, such that: $\forall(a_i), a_i \in R^K \Rightarrow \theta_{LOW} < a_i < \theta_{HIGH}$. At the evaluation time, the missing value(s) are handled by augmenting the assignment in input data with one or two additional new values. If the original assigned value v is lower than the range of values, then it is replaced with $\theta_{LOW}$. If the original assigned value v is higher than the range of values, then it is replaced with $\theta_{HIGH}$. Otherwise if the original assigned value v is not in the range of values then it is replaced with two values: ceiling(v) immediate higher value in $R^K$; and floor(v) immediate lower value in $R^K$.

As shown at block 1008, an inverted index is generated over the range of values for each variable. For each variable, the range of values includes the predicate values for predicates containing the variable and the additional values added by augmentation to account for values from input data outside of the predicate values from the predicates. The inverted index can be built using efficient data structures for maps and sets. For example, the inverted index can be built using R-B trees, sorted sets for predicate sets, bitsets for predicate sets. Predicate set can be built as a bitset when predicate expressions have exactly one predicate of a given dimension, by enforcing this constraint. Many other similar data structures can be utilized to represent map and the set.

In some configurations, the inverted index is called a GenericIndex. As a notional convenience, the set of all predicates P for a dimension A is stated as $P^A = \{{}^Ap_1, {}^Ap_2, {}_Ap_3, \ldots\}$. An evaluation of a predicate ${}^Ap_i$ under attribute assignment $\{A=\{v\}\}$ as a function of the predicate is expressed as: ${}^Ap_i.\text{eval}(v) \rightarrow \text{true/false}$.

The GenericIndex is a map from a set of keys K to a set of predicates. The key set is one of the following: in the case of non-metric values, the set is a union: $K = R^A \cup \{\theta\}$; in the case of metric values, the set is a union: $K = R^A \cup \{\theta, \theta_{Low}, \theta_{HIGH}\}$. The index maps $K \rightarrow \{{}^Ap_i\}$.

The GenericIndex can include three distinct hybrid maps to handle different operators, as shown below. For non-metric data only $H^A$ is built, while for metric data all three $H^A$, $H^A_{LOW}$, and $H^A_{HIGH}$ are built. Pseudocode for the indexing method in accordance with one configuration is provided in FIG. 11.

a. $H^A$: Map over values of set $R^A \cup \{\theta\}$ to handle equality and inequality operators. Following criteria is met by $H^A$ $$\forall({}^Ap_i), \forall(v_i) | {}^Ap_i \in H^A[v_i] \rightarrow {}^Ap_i.\text{eval}(v_i)=\text{true} \,\&\&$$
$$({}^Ap_i.\text{operator}='=' \| {}^Ap_i.\text{operator}='!=')$$

b. $H^A_{LOW}$: Map over values of set $R^A \cup \{\theta_{LOW}\}$ to handle $<$ operator, operator $\leq$ is treated as a disjunction of $<$ and $=$ operators. Following criteria is met by the index:

$$\forall({}^Ap_i), \forall(v_i) | {}^Ap_i \in H^A_{LOW}[v_i] \rightarrow {}^Ap_i.\text{eval}(v_i)=\text{true} \,\&\&$$
$$({}^Ap_i.\text{operator}='<' \| {}^Ap_i.\text{operator}='\leq')$$

c. $H^A_{HIGH}$: Map over values of set $R^A \cup \{\theta_{HIGH}\}$ to handle $>$ operator, operator $\geq$ is treated as a disjunction of $>$ and $=$ operators. Following criteria is met by the index:

$$\forall({}^Ap_i), \forall(v_i) | {}^Ap_i \in H^A_{HIGH}[v_i] \rightarrow {}^Ap_i.\text{eval}(v_i)=\text{true} \,\&\&$$
$$({}^Ap_i.\text{operator}='>' \| {}^Ap_i.\text{operator}='\geq')$$

Evaluation of predicate statements using the GenericIndex includes performing a lookup using the value(s) assigned to a variable to determine the set of predicates that are true under the given assignment of the variable value. As indicated above, at the evaluation time, in the case of a non-metric variable, the missing variable assignment value (s) are augmented with a single symbol θ. Thus, the assignment $\{A=\{\theta\}\}$ matches the predicate $(A \neq v_1)$. In the case of a metric variable, the missing value(s) are handled by augmenting the assignment with one or two additional new values besides the addition of symbol θ. If the original assigned value v is lower than the range of values, then it is replaced with $\theta_{LOW}$. If the original assigned value v is higher than the range of values, then it is replaced with $\theta_{HIGH}$. Otherwise if the original assigned value v is not in the range of values then it is replaced with two values: ceiling(v) immediate higher value in $R^K$; and floor(v) immediate lower value in $R^K$. When multiple values are looked up, the results are a set union of the results of each individual lookup.

As an example to illustrate, consider the following set of predicates where the variable or dimension is 'hr' and values are continuous metric space of numbers:

$p_0$: (hr<20)
$p_1$: (hr<18)
$p_2$: (hr<=10)
$p_3$: (hr>=6)
$p_4$: (hr>10)
$p_5$: (hr !=8)

The set is the set of all values of the predicate: $R^{hr}=\{6, 8, 10, 18, 20\}$. Table 1 below shows an inverted index for the above predicates:

TABLE 1

Inverted Index

| Value | $H^{hr}$ | Value | $H^{hr}_{LOW}$ | Value | $H^{hr}_{HIGH}$ |
|---|---|---|---|---|---|
| 6 | {$p_3$, $p_5$} | $\theta_{LOW}$ | {$p_0$, $p_1$, $p_2$} | 6 | { } |
| 8 | { } | 6 | {$p_0$, $p_1$, $p_2$} | 8 | {$p_3$} |
| 10 | {$p_2$, $p_5$} | 8 | {$p_0$, $p_1$, $p_2$} | 10 | {$p_3$} |
| 18 | {$p_5$} | 10 | {$p_0$, $p_1$} | 18 | {$p_3$, $p_4$} |
| 20 | {$p_5$} | 18 | {$p_0$} | 20 | {$p_3$, $p_4$} |
| $\theta$ | {$p_5$} | 20 | { } | $\theta_{HIGH}$ | {$p_3$, $p_4$} |

As an example to illustrate evaluation using this inverted index, suppose the inverted index is being evaluated for a simple assignment of hr=11:

$AS^{hr}=\{hr=\{11\}\}$.

Augmenting the values of the variable assignments for the evaluation and performing a lookup in the inverted index provides the following:

$AS^{hr}=\{hr=\{11,\theta,\lfloor 11 \rfloor,[11]\}\} \Rightarrow H^{hr}[11] \cup H^{hr}[\theta]H^{hr}[*]$
$\cup H^{hr}_{LOW}[11] \cup H^{hr}_{HIGH}[11]] \Rightarrow H^{hr}[11] \cup H^{hr}$
$[\theta] \cup H^{hr}[*] \cup H^{hr}_{LOW}[10] \cup H^{hr}_{HIGH}$
$[18] \Rightarrow \{ \} \cup \{P5\} \cup \{ \} \cup \{P0,P1\} \cup \{P3,P4\} \Rightarrow \{P0,P1,P3,P4,P5\}$ It can be verified, that the set of predicates identified above is the complete and correct set of predicates that are satisfiable under the assignment $AS^{hr}$.

Exemplary Operating Environment

Figure 12:
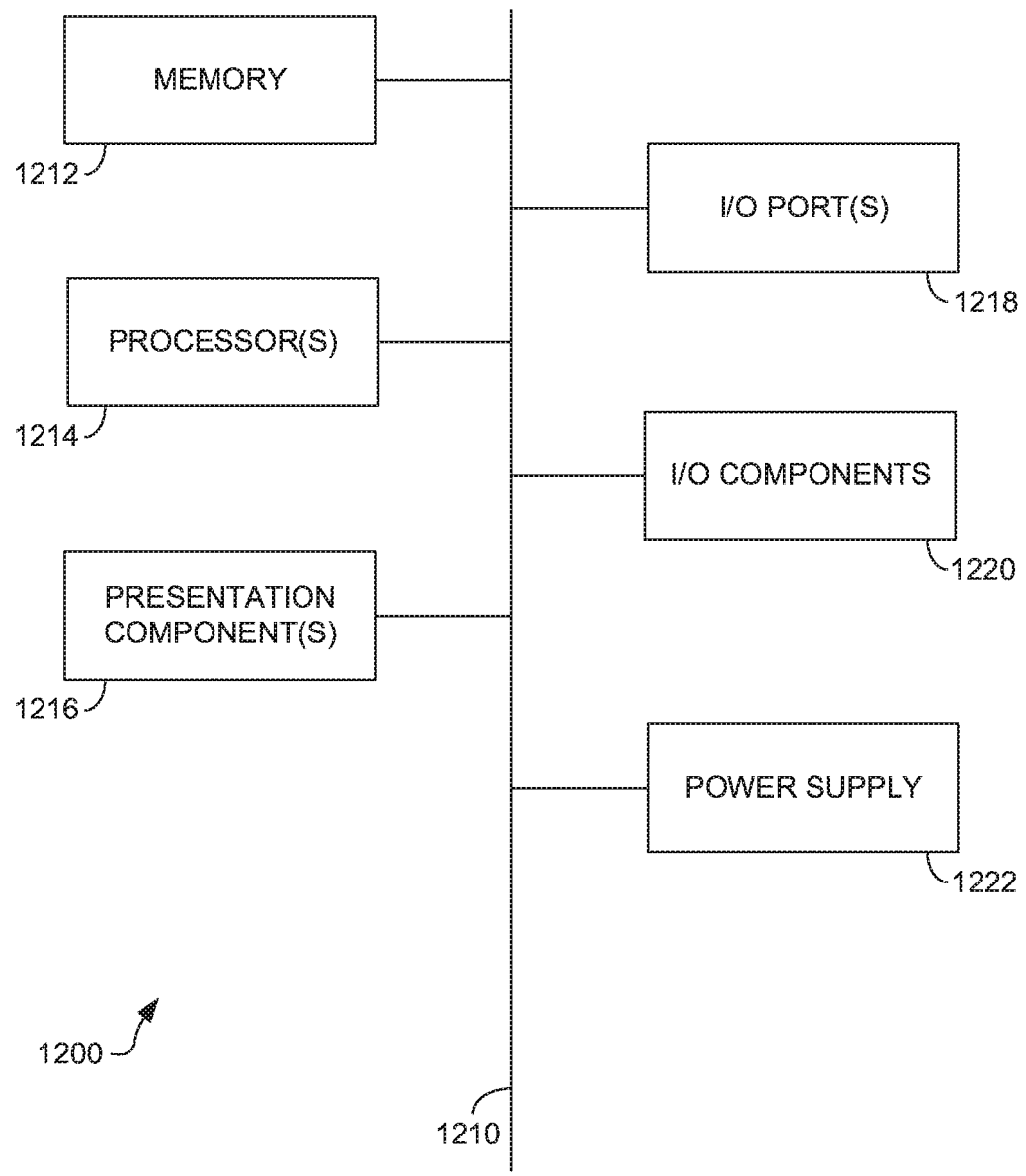
FIG. 12 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1200. The computing device 1200 may be equipped with depth cameras, such as, stereoscopic camera systems, infrared camera systems, RGB camera systems, and combinations of these for gesture detection and recognition. Additionally, the computing device 1200 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   receiving input data comprising a value for each of one or more variables;
   accessing an inverted index stored on a computer-readable storage media, the inverted index mapping values for a plurality of variables to predicates that evaluate to true for corresponding values in one or more predicate statements;
   querying the inverted index using the input data to identify, for each value, one or more predicates mapped to the value in the inverted index to provide a plurality of identified predicates; and
   evaluating at least a portion of the one or more predicate statements that include one or more of the identified predicates by treating each identified predicate as true.

2. The one or more computer storage media of claim 1, wherein the inverted index comprises a plurality of variable inverted indexes, each variable inverted index corresponding to a specific variable and mapping predicate values for the specific variable to predicates that evaluate to true based on the predicate values.

3. The one or more computer storage media of claim 1, wherein each predicate is identified in the inverted index with a predicate statement identifier identifying a predicate statement containing the predicate and a node identifier identifying the predicate within the predicate statement.

4. The one or more computer storage media of claim 1, wherein evaluating the one or more predicate statements comprises evaluating a first predicate statement by:
   accessing a bit string for the first predicate statement, the bit string comprising a plurality of bit positions, each of at least a portion of the bit positions corresponding with a predicate from the first predicate statement;
   for each identified predicate for the first predicate statement, setting a bit in the bit string corresponding to the identified predicate to one; and
   determining if the first predicate statement evaluates to true using the bit string.

5. The one or more computer storage media of claim 4, wherein at least a portion of the bit positions in the bit string correspond with logical operators within the first predicate statement, and evaluating the first predicate statement further comprises:
   setting a bit to one for each logical operator identified as true based on the logical operator and a bit value of one or more predicates corresponding to the logical operator.

6. The one or more computer storage media of claim 5, wherein a particular bit position in the bit string identifies whether the first predicate statement evaluates to true, and evaluating the first predicate statement further comprises:
   setting a bit value for the particular bit position based on bit values of one or more of the logical operators.

7. The one or more computer storage media of claim 1, wherein evaluating the one or more predicate statements comprises providing a result set that identifies each predicate statement that is evaluated as true.

8. The one or more computer storage media of claim 7, wherein the result set comprises a bit string with a plurality of bit positions, each bit position corresponding to a different predicate statement.

9. The one or more computer storage media of claim 8, wherein a bit value for each bit position is initialized prior to evaluating the predicate statements for the input data.

10. A computerized method comprising:
   generating a bit string for each of a plurality of predicate statements, the bit string for each predicate statement comprising a plurality of bit positions with each predicate and each logical operator in the predicate statement having a corresponding bit position in the bit string for the predicate statement;
   generating an inverted index mapping predicate values for variables to predicates from the predicate statements that evaluate to true for the predicate values; and storing the bit strings and inverted index on one or more computer storage media to evaluate the predicate statements for input data.

11. The computerized method of claim 10, wherein generating the bit string for each predicate statement comprises:
representing the predicate statement as a predicate statement tree with a plurality of nodes in which each leaf node is a predicate from the predicate statement and each intermediate node is a logical operator from the predicate statement; and
wherein each node from the predicate statement tree has a corresponding bit position in the bit string for the predicate statement.

12. The computerized method of claim 11, wherein generating the bit string for each predicate statement further comprises:
assigning a predicate statement identifier to the predicate statement;
assigning a node identifier to each node in the predicate statement tree; and
identifying each predicate in the predicate statement by a combination of the predicate statement identifier for the predicate statement and the node identifier assigned to the node corresponding with the predicate.

13. The computerized method of claim 10, wherein generating the bit string for each predicate statement comprises:
initializing a bit value to zero for each bit position corresponding to a predicate from the predicate statement; and
initializing a bit value to zero or one for each bit position corresponding to a logical operator from the predicate statement based on the logical operator and a bit value of one or more predicates statements corresponding to the logical operator.

14. The computerized method of claim 10, wherein generating the inverted index comprises:
adding, to the inverted index, a special value for a non-metric variable to handle input data containing a value for the non-metric variable that is outside a range of predicate values for the non-metric variable in predicates from the predicate statements.

15. The computerized method of claim 10, wherein generating the inverted index comprises:
adding, to the inverted index, a special value for a metric variable to handle equality and inequality operators when input data contains a value for the metric variable that is outside a range of predicate values for the metric variable in predicates from the predicate statements.

16. The computerized method of claim 10, wherein generating the inverted index comprises:
adding, to the inverted index, a special value for a metric variable to handle < and<= operators.

17. The computerized method of claim 10, wherein generating the inverted index comprises:
adding, to the inverted index, a special value for a metric variable to handle > and>= operators.

18. The computerized method of claim 10, wherein the method further comprises:
receiving input data comprising a value for each of one or more variables;
for each value, identifying one or more predicates mapped to the value in the inverted index to provide a plurality of identified predicates; and
evaluating one or more of the predicate statements that include one or more of the identified predicates by treating each identified predicate as true.

19. The computerized method of claim 18, wherein evaluating the one or more predicate statements comprises evaluating a first predicate statement by:
accessing a bit string for the first predicate statement, the bit string comprising a plurality of bit positions, each of at least a portion of the bit positions corresponding with a predicate from the first predicate statement;
for each identified predicate for the first predicate statement, setting a bit in the bit string corresponding to the identified predicate to one; and
determining if the first predicate statement evaluates to true using the bit string.

20. A computer system comprising:
one or more processors; and
one or more computer storage media storing computer-usable instructions that cause the one or more processors to:
generate a bit string for each of a plurality of predicate statements, each bit string corresponding to one of the predicate statements and comprising a plurality of bit positions with each of one or more of the bit positions corresponding with a predicate in the predicate statement and each of one or more of the bit positions corresponding with a logical operator in the predicate statement;
generate an inverted index mapping predicate values for variables to predicates from the plurality of predicate statements that evaluate to true given the corresponding predicate values; and
evaluate the plurality of predicate statements for input data using the bit strings and the inverted index.

* * * * *